EBERHARD KÖNIG
*INVENTOR.*

April 26, 1966        E. KÖNIG        3,247,704
SAMPLE PICK-UP FOR GAS CHROMATOGRAPHS
Filed July 5, 1963        3 Sheets-Sheet 2
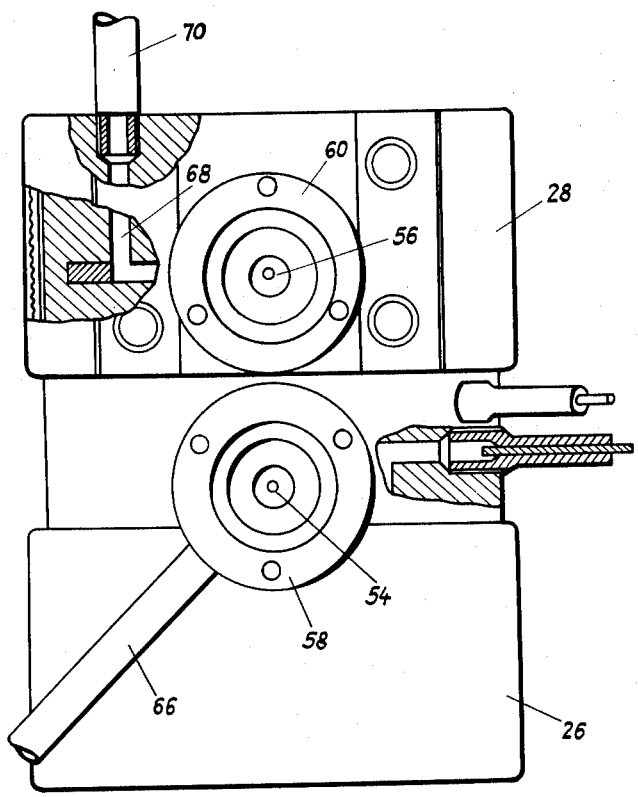
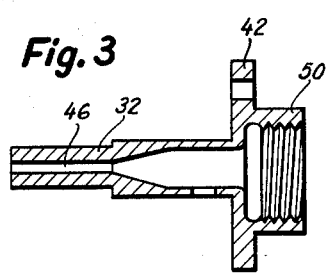
Fig. 2
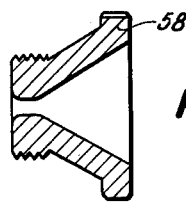
Fig. 3
Fig. 4
EBERHARD KÖNIG
*INVENTOR.*
BY Andrew L. Ney

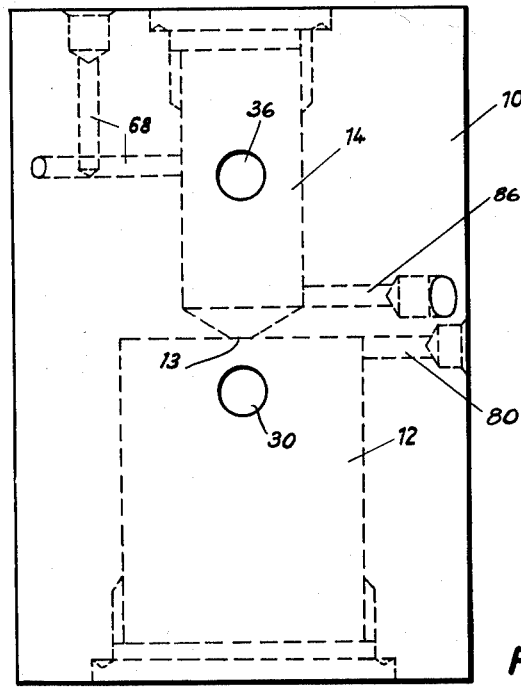
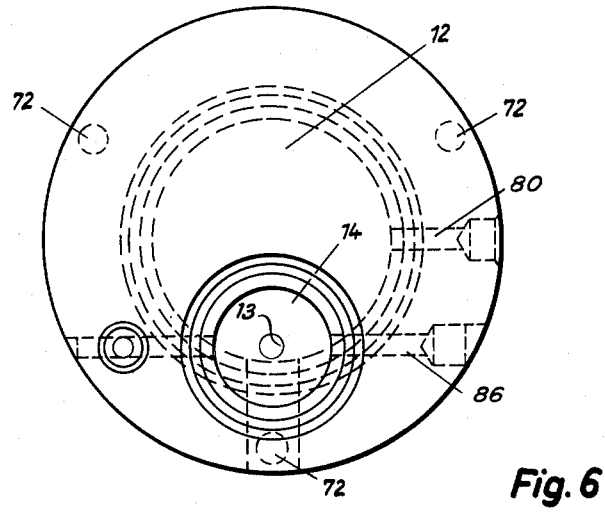

3,247,704
SAMPLE PICK-UP FOR GAS CHROMATOGRAPHS
Eberhard König, Uberlingen (Bodensee), Germany, assignor to Bodenseewerk Perkin-Elmer and Co., G.m.b.H., Uberlingen (Bodensee), Germany
Filed July 5, 1963, Ser. No. 293,045
Claims priority, application Germany, July 13, 1962, B 68,018
5 Claims. (Cl. 73—23.1)

The present invention relates to a sample pick-up or injection means for a gas chromatograph and, in particular, to that type of a pick-up adapted to receive a liquid sample which must be evaporated in a heated evaporator block prior to its introduction into a separating column.

In a conventional gas chromatograph a sample is introduced into the evaporator block by means of an injection needle. The evaporation chamber, provided in the evaporator block, is closed off to the atmosphere through a relatively thick diaphragm made of, for example, silicon rubber or a similar material. The injection needle is inserted through the diaphragm and the sample is squeezed out of the needle. Next, the needle is withdrawn and the puncture created by the needle seals by itself.

It is well known in the gas chromatography art that sharp peaks should be developed at the exit of the separating column in order to be able to correctly separate the individual components of the sample mixture. Because of this, one of the objects of the prior art sample pick-ups was to create sudden evaporation of the injected liquid sample. This object was based on the fact that if the sample was evaporated over a relatively long period of time, the sample vapors would not be supplied to the inlet of the separating column as narrow packets thus causing the peaks to diverge. This result would cause considerable difficulties if relatively large sample quantities would be used such as in the case of preparative gas chomatography.

In order to effect sudden evaporation of a liquid sample large quantities of heat are necessary. In order to prevent condensation of the non-volatile components the temperature of the evaporator block should not be reduced substantially after the heat is removed. For this reason, filling bodies with large surfaces and substantial heat capacity are arranged in the evaporation chambers of presently known evaporator blocks. These bodies are able to transmit the required heat quantities quickly for sudden evaporation of the sample liquid. In other known evaporator blocks quick heating electric heaters are provided. These heaters are connected shortly before the liquid sample is introduced. In some arrangements the electrical heaters are placed directly in the evaporation chamber into which the sample is introduced.

If the sample is relatively large and it must be evaporated suddenly, the expanding evaporating sample may reflux into the carrier gas supply line by back wash due to smallness of the evaporation chamber. Because the carrier gas supply line is relatively cold compared to the evaporation chamber, the non-volatile components of the sample may deposit on the walls as a result of condensation. In addition, unevaporated particles of the sample liquid may leave the evaporation chamber and enter the separating column. It is obvious that both these effects will lead to measuring errors and peak expansion. If the evaporation chamber is made too large the sample vapors may mix too strongly with the carrier gas. In this case, the sample vapors are, again, not supplied to the inlet of the separating column as a narrow packet but rather are supplied as a sample vapor-carrier gas mixture over a relatively long period of time.

It is an object of the present invention to provide a new and improved sample pick-up.

It is another object of the present invention to provide a sample pick-up capable of providing complete evaporation of a liquid sample which is supplied to it.

It is a further object of the present invention to provide a sample pick-up which is not subject to the aforementioned disadvantages and limitations.

A sample pick-up for gas chromatographs constructed in accordance with one aspect of the present invention comprises as a unitary structure a sample evaporation block, said block comprising first evaporation means for receiving a liquid sample and for at least partially evaporating the liquid sample and second evaporation means, in series with or downstream from the first evaporation means for evaporating any portions of the liquid sample not evaporated by the first evaporation means.

For a better understanding of the present invention, together with other and further objects thereof, reference is had to the following description, taken in connection with the accompanying drawings, and its scope will be pointed out in the appended claims.

Referring to the drawings:

FIGURE 2 is a partial sectional view of the front elevation of the sample pick-up of FIGURE 1;

FIGURES 3 and 4 show two component parts of the sample pick-up constructed in accordance with the present invention.

FIGURE 5 is a front elevation of the evaporator block of the sample pick-up of FIGURE 1 taken along line 5—5 with the sealing plugs omitted; and FIGURE 6 is a top view of the block of FIGURE 1.

*Description and operation*

Figure 1:
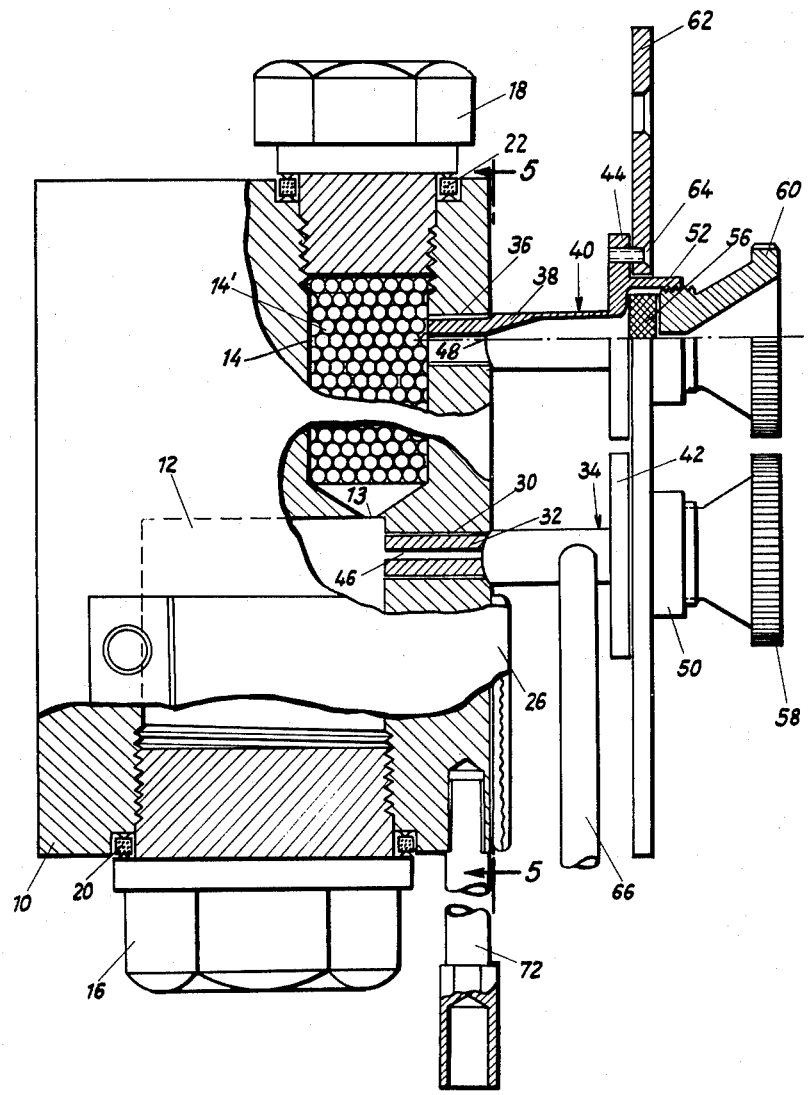
FIGURE 1 is a partial sectional view of a side elevation of a sample pick-up constructed in accordance with the present invention.

Reference numeral 10 designates an evaporator block of basically cylindrical shape. The block 10 has formed therein two evaporation chambers 12 and 14. The chambers 12 and 14 are formed as cylindrical recesses in opposite ends of the evaporator block. These recesses are closed off to the atmosphere respectively by plugs 16 and 18 and gaskets 20 and 22. The chambers 12 and 14 are connected to each other through an opening 13. Chamber 12 is seen to be substantially larger than chamber 14. The evaporator block 10 is heated by means of annular heating bodies 26 and 28.

A bore 30, provided in the skirt of the evaporator block 10, opens into chamber 12. The neck portion 32 of a diaphragm support, generally designated by reference numeral 34, is soldered into bore 30. A similar bore 36, provided in the skirt of evaporator block 10, opens into chamber 14. The neck portion 38 of a second diaphragm support, generally designated by reference numeral 40, is soldered into bore 36. The neck portions 32 and 38 of diaphragm supports 34 and 40, respectively, protrude from the skirt area of the evaporator block 10 and are formed with flanges 42 and 44 at their ends. The sectional view of FIGURE 1 of diaphragm support 40 shows that a relatively narrow, outwardly funnel-shaped channel 48 exists in the neck portion 38. A similar channel 46 exists in neck portion 32. The outer mouth openings of channels 46 and 48 are surrounded by collars 50 and 52 respectively. The collars 50 and 52 are threaded internally. The outer mouth openings of the channels 46 and 48 are closed off to the atmosphere by thick silicon injection diaphragms 54 and 56 respectively. These diaphragms are positioned by funnel-shaped needle guide screws 58 and 60 which are screwed into the internal thread of the collars 50 and 52 respectively. A bracket plate 62, fixed to the flanges 42 and 44 by means of screws 64, simultaneously serves as a support and a heat conducting element.

A carrier gas supply line 66 terminates in channel 46 of neck portion 32 immediately behind diaphragm 54. As shown in FIGURES 5 and 6, a channel 68 runs from chamber 14 to an outlet pipe 70 which is normally connected with the inlet of the separating column.

Reference numeral 72 designates means for supporting the evaporator block 10. This means may also serve as a heat conductive element.

The invention is based on the fact that sudden evaporation of the sample liquid is substantially less important than was assumed in the case of prior sample pick-ups. Volatile components of the sample evaporate quickly while non-volatile components evaporate slowly. Since the non-volatile components take longer to travel through the separating column, the amount of additional time required to evaporate them is negligible when compared to their travel time through the separating column. By slower evaporation of the liquid sample over-loading at the column inlet is avoided. In addition, reflux of the sample vapors into the carrier gas supply line is also prevented. For these reasons, the first evaporation chamber 12 is empty and does not have means for sudden evaporation of the liquid sample. On the other hand, the second evaporation chamber 14 is provided with filling members which simultaneously serve as heat storages and also reduce the effective volume of the chamber. Any non-evaporated portions of the liquid sample, which are entrained from chamber 12 into chamber 14 by the gas stream, are completely evaporated due to the filling bodies in evaporation chamber 14.

A further feature of the present invention is that the second evaporation chamber 14 may alone be used for evaporation of smaller samples. For this reason, evaporation chamber 14 is also shown to have a self sealing injection diaphragm. Thus, for small sample quantities the sample is directly injected into chamber 14 so that the least amount of mixing of the sample vapors with the carrier gas takes place.

The injection needle, containing a liquid sample, is inserted through either of the injection diaphragms 54 or 56 dependent upon the size of the sample. The funnel-shaped extensions of guide screws 58 and 60 and the channels 46 and 48 serve as a guide for the injection needle. The diaphragms 54 and 56 are kept at reasonable temperatures so as not to be damaged even in the event of high temperatures present in the evaporator block because the block and the diaphragms are interconnected through poorly heat conductive neck portions 32 and 38. When the injection needle is inserted through narrow channels 46 and 48 the space in the channels is almost filled by the needle. Therefore, very little vapor may reach the colder diaphragms 54 and 56. The larger evaporation chamber 12 serves to evaporate large samples such as the ones used for preparative gas chromatography. The dimensioning of chamber 12 is a compromise between the requirement that very little boiling or bubbling substance should leave the evaporator block in liquid form and the requirement that the dead volume of the evaporator block should be as small as possible so as to prevent mixing and hence dilution of the sample with the carrier gas. The volume of evaporation chamber 12 may be kept relatively small since the second evaporation chamber 14, having a smaller volume, is arranged behind evaporation chamber 12 and effects complete evaporation of the liquid particles which leave evaporation chamber 12.

Relatively large samples are introduced into chamber 12. The highly volatile components are more easily evaporated than the non-volatile components. This does not create any problems since the highly volatile components appear first at the exit of the separating column as sharp peaks. On the other hand non-volatile components require a longer amount of time to travel through the separating column. This causes peak expansion. The peak expansion, caused by the finite evaporation time of these non-volatile components, is negligible when compared to the peak expansion due to extended travel time through the column.

By not effecting sudden evaporation of the sample liquid overloading at the column entrance is avoided. Furthermore, the danger of a backwash is also reduced. Small sample quantities are introduced into the smaller evaporation chamber 14. Thus, chamber 14 has the dual function of serving as a second evaporation chamber for large samples while serving as the main evaporation chamber for small samples. An outlet channel 68, shown in FIGURE 2, leads from chamber 14. This channel is seen to have a bend which hinders the movement of non-evaporated portions of the sample liquid.

The carrier gas inlet 66 opens into channel 46 immediately behind diaphragm 54. This flow of carrier gas is an effective coolant for the diaphragm. In addition, evaporated sample gas is prevented from entering channel 46 since the carrier gas continuously flows in such a direction as to oppose the sample vapors. Therefore, sample residues are prevented from being deposited in channel 46 and on the diaphragm 54. In addition, parts of the sample which have been deposited on the diaphragm 54 when the injection needle is withdrawn are quickly carried along by the carrier gas flow and fed into the evaporation chamber 12.

After the injection needle is withdrawn the diaphragms 54 and 56 automatically seal due to their elasticity. Diaphragms 54 and 56 may be easily removed and exchanged by simply unscrewing the screws 58 and 60. As indicated by the bores 80 and 86 in FIGURE 5 and 6, alternative feed means may be utilized for introducing liquid sample into chambers 12 and 14, respectively, instead of employing bores 30 and 36 in conjunction with diaphragms and injection needles.

While there has been described what is at present considered a preferred embodiment of this invention, it will be obvious to those skilled in the art that various changes and modifications may be made therein without departing from the invention and it is intended to cover all such changes and modifications as fall within the true spirit and scope of the invention as defined by the claims.

What is claimed is:

1. A sample pick-up for gas chromatographs comprising as a unitary structure a sample evaporation block, said block comprising:
   first evaporation means for receiving a liquid sample and for at least partially evaporating said liquid sample;
   and second evaporation means downstream from said first evaporation means for receiving the sample fluid from said first evaporation means and for evaporating any portions of said liquid sample not evaporated by said first evaporation means.

2. A sample pick-up for gas chromatographs comprising as a unitary structure a sample evaporation block, said block comprising:
   means defining a first evaporation chamber for receiving a liquid sample and for at least partially evaporating said liquid sample;
   and means defining a second evaporation chamber of smaller volume than said first evaporation chamber and downstream therefrom and having heat conductive elements inserted therein for receiving the sample fluid from said first chamber and for evaporating any portions of said liquid sample not evaporated by said first evaporation chamber.

3. A sample pick-up for gas chromatographs comprising:
   first evaporation means for receiving a liquid sample and for at least partially evaporating said liquid sample;
   and second evaporation means for evaporating any portions of said liquid sample not evaporated by said first evaporation means and additionally for receiving liquid samples, substantially smaller than those normally received by said first evaporation means, and for completely evaporating said substantially smaller samples, and means for introducing said smaller samples into said second evaporation means.

4. A sample pick-up for gas chromatographs comprising:
   a first evaporation chamber for receiving a liquid sample and for at least partially evaporating said liquid sample;
   a first self-sealing diaphragm for closing off said first evaporation chamber to the atmosphere and through which a sample carrying injection needle is inserted into said first evaporation chamber;
   and a second evaporation chamber, in open communication with said first evaporation chamber, for evaporating any portions of said liquid sample not evaporated by said first evaporation chamber, and means for introducing into said second chamber liquid samples which are substantially smaller than those normally received by said first chamber.

5. A sample pick-up for gas chromatographs comprising:
   a first evaporation chamber for receiving a liquid sample and for at least partially evaporating said liquid sample;
   a first self-sealing diaphragm for closing off said first evaporation chamber to the atmosphere and through which a sample carrying injection needle is inserted into said first evaporation chamber;
   a second evaporation chamber, in open communication with said first evaporation chamber, for evaporating any portions of said liquid sample not evaporated by said first evaporation chamber and additionally for receiving liquid samples, substantially smaller than those normally received by said first evaporation chamber, and for completely evaporating said substantially smaller samples;
   and a second self-sealing diaphragm for closing off said second evaporation chamber to the atmosphere and through which a sample carrying injection needle is inserted into said second evaporation chamber.

References Cited by the Examiner

UNITED STATES PATENTS 1,309,514   7/1919   Empis _____ 165—104

OTHER REFERENCES

Gas Chromatography, edited by Coates, 1958, Academic Press, N.Y., copy in Group 430 (pages 293, 204, 205 and 206 relied upon).

Fuller, I.S.A. Journal, November 1956, copy in Scientific Library, vol. 3, No. 11 (pages 440 and 441 relied upon).

Elsey et al.: Journal of Chromatography, vol. 5, 1961, pages 89–90 of interest. (Copy in Scientific Library.)

Dimbat et al.: Analytical Chemistry, vol 26, No. 3, March 1956 (page 290 of interest). (Copy in Group 170.)

LOUIS R. PRINCE, *Primary Examiner.*

RICHARD C. QUEISSER, S. C. SWISHER,
*Assistant Examiners.*